UNITED STATES PATENT OFFICE.

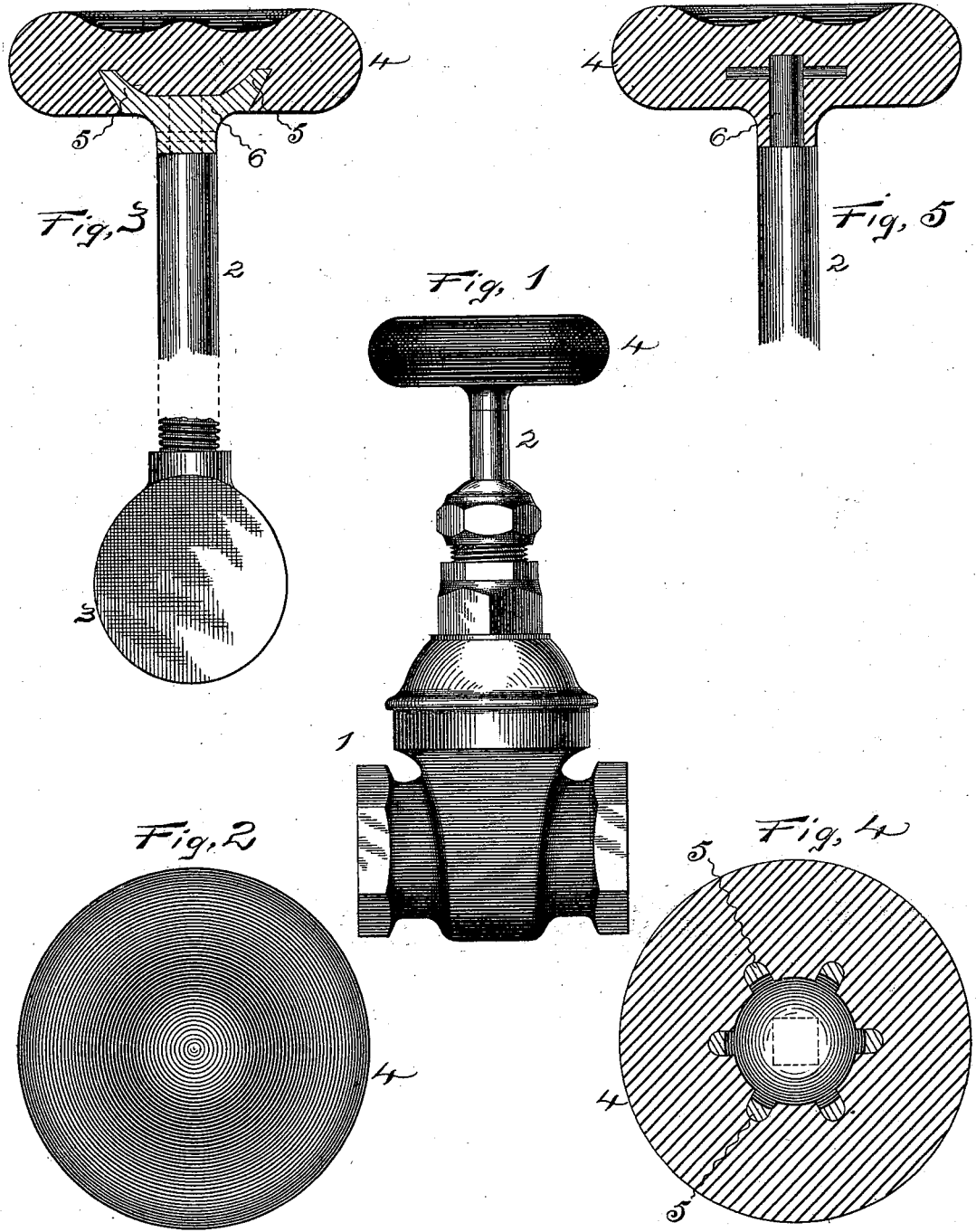

FREDERICK C. ROCKWELL, OF HARTFORD, CONNECTICUT.

VALVE-SPINDLE.

SPECIFICATION forming part of Letters Patent No. 507,594, dated October 31, 1893.

Application filed October 18, 1892. Serial No. 449,214. (No model.)

*To all whom it may concern:*

Be it known that I, FREDERICK C. ROCKWELL, a citizen of the United States, residing at Hartford, in the county of Hartford and State of Connecticut, have invented certain new and useful Improvements in Valve-Spindles, of which the following is a full, clear, and exact specification.

The invention relates more particularly to the spindles of gates, valves and cocks provided for systems that conduct steam, hot water or other heated fluids, the object being to provide for such articles a cheap, ornamental and durable spindle having a heat non-conducting head permanently secured thereto, so constructed that there are no metallic parts exposed upon the top by which the hand can be burned by accidental contact, and having no parts that can unscrew or work loose so that the spindle cannot be turned to operate the valve, cock or gate.

Referring to the accompanying drawings: Figure 1 is a side view of a valve provided with the improvement. Fig. 2 is a top view of the head of the spindle. Fig. 3 is a view of the gate and spindle with the upper end cut in section. Fig. 4 is a horizontal section of the head of the spindle; and Fig. 5 is a section of the upper end of a modified form of spindle.

In the views 1 indicates the body of a valve of any common form and construction, having the usual spindle 2. This spindle in the interior is connected with a gate, disk or plug 3 which stops the opening through the valve and is subjected to the heating effects of the fluid which passes through the system, and after passing through a stuffing box to the exterior terminates in a head 4 by which it may be turned to open or close the passage. The outer end of this spindle is preferably enlarged and provided with outwardly projecting inclined prongs 5 that are embedded out of sight in the interior of the material of the head. This head is formed of a fibrous material, as asbestus, which is heat non-conducting and tenacious, thoroughly incorporated with a binder, as a gum similar to dammar or shellac, to which a filler is sometimes added in the shape of comminuted or powdered mica, soapstone or feldspar. In the process of manufacture this material is thoroughly mixed and placed in dies with the end 6 of the spindle and subjected to heat and pressure until it is very hard. If desired of course the end of the spindle may be an independent piece with an opening to receive a part of the spindle, and with a perforation for a small pin to hold the parts together, as illustrated by the dotted lines in Figs. 3 and 4. Or the pin through the end of the spindle may be molded directly in the center of the head. This construction produces a practically integral spindle which is simple and cheap, having a metallic shank which can be subjected to the heat of the passing fluids without deterioration, and a heat non-conducting head which will not break nor change under the influence of the heat conducted by the metallic shank of the spindle. The upper surface of the head is perfectly smooth and cannot in any manner injure or scratch the hand when used; neither is there any projecting or exposed metallic part to burn the hand when the head is grasped; nor is there any part which can unscrew so as to allow the handle to turn loose and wear out or crack and become useless, as with the ordinary spindle in which, as it is well known, the nut which holds the handle to the end of the spindle frequently unscrews allowing the handle to turn freely, as well as being a conductor of heat from the interior so that the hand is often burned by contact with the nut or end of the spindle when turning the valve. A spindle thus formed has a firm, strong and durable head which will not become hot, as will the heads of spindles which are formed entirely of metal in order to be strong enough for the uses to which they are to be put. It is cheap, as there are no screw-threads or nuts to be cut and put together; and it may be formed very ornamental or provided with any device indicating the character of the valve, or the name of the maker; while the heat of the spindle so affects the composition of the head that it holds more closely to the spindle instead of shrinking away, as does the wood or paper handles sometimes used.

I claim as my invention—

5   A valve attachment comprising a metallic valve spindle having an enlarged outer end and a hand wheel or head of compressed fibrous non-conducting material entirely embedding said outer end of the spindle and having a smooth or unbroken upper surface of non-conducting material, substantially as specified.

FREDERICK C. ROCKWELL.

Witnesses:
   HARRY R. WILLIAMS,
   CLARENCE E. BUCKLAND.